(12) United States Patent
Papiernik et al.

(10) Patent No.: US 6,845,350 B1
(45) Date of Patent: Jan. 18, 2005

(54) SIMULATION METHOD

(75) Inventors: Wolfgang Papiernik, Neunkirchen (DE); Christof Sinn, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 776 days.

(21) Appl. No.: 09/713,824

(22) Filed: Nov. 15, 2000

(30) Foreign Application Priority Data

Nov. 18, 1999 (DE) .......................................... 199 55 587
Sep. 27, 2000 (DE) .......................................... 100 47 928

(51) Int. Cl.⁷ ............................................. G06F 17/50
(52) U.S. Cl. ...................... 703/13; 700/159; 700/163
(58) Field of Search .............................. 703/13; 700/86, 700/159, 163, 184, 189

(56) References Cited

U.S. PATENT DOCUMENTS

| | | | | |
|---|---|---|---|---|
| 5,291,393 A | * | 3/1994 | Matsumoto et al. | .......... 700/86 |
| 5,594,652 A | * | 1/1997 | Penn et al. | ................. 700/119 |
| 5,682,319 A | * | 10/1997 | Boland et al. | ............. 700/189 |
| 6,341,996 B1 | * | 1/2002 | Brien et al. | .................... 451/8 |

* cited by examiner

Primary Examiner—Albert W. Paladini
(74) Attorney, Agent, or Firm—Baker Botts L.L.P.

(57) ABSTRACT

A simulation method for three-dimensional processing by a CNC-controlled processing machine is determined by means of an initial data record which describes idealized processing instructions for a processing machine, wherein a control data record for a control unit controlling the processing machine is determined from the initial data record by means of an arithmetic unit. At least one two-dimensional projection of the processing is determined from the initial data record and/or the control data record and is displayed.

9 Claims, 2 Drawing Sheets

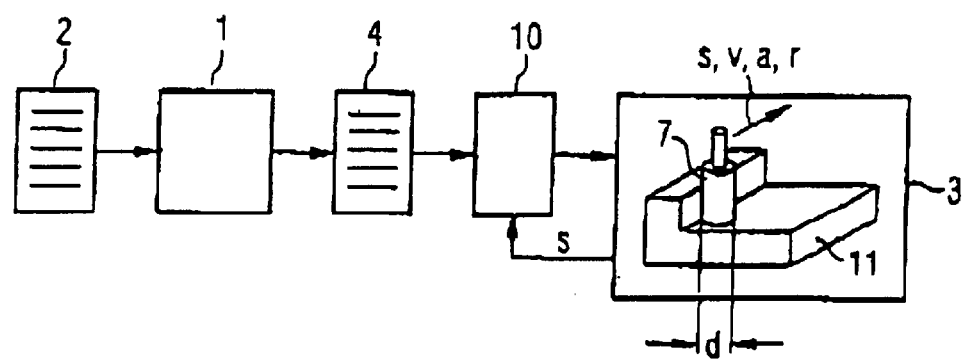
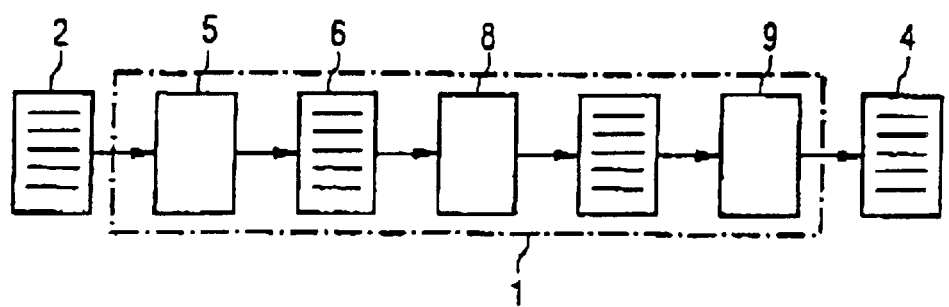

SIMULATION METHOD

BACKGROUND OF THE INVENTION

The present invention relates to a simulation method for a data record which describes three-dimensional processing by a CNC-controlled processing machine, for example a milling machine.

In the case of CNC-controlled processing machines, a workpiece is either directly coded by a programmer, or the workpiece is modeled with the aid of a CAD system and then converted into an equivalent CNC part program. The CNC part program or the CNC model correspond in this case to idealized processing instructions for the processing machine. The CNC program is loaded into a CNC controller, and the processing machine is controlled in accordance with the CNC program.

There are no problems with this mode of procedure when a workpiece thus fabricated falls within the desired process tolerances of an ideal workpiece. However, when a fabricated workpiece does not correspond to the requirements placed on it, the question arises as to what variations constitute an acceptable workpiece.

It is certainly possible to change sequentially individual processing instructions and/or individual operating parameters of the processing machine, to fabricate a new workpiece and then to inspect this newly fabricated workpiece. However, this mode of procedure is labor and material intensive and hence costly, specifically because it is often difficult to determine the cause of the deviations of the actually fabricated workpiece from the desired workpiece.

SUMMARY OF THE INVENTION

It is the object of the present invention to create a fast, simple and cost-effective procedure for formulating idealized processing instructions which to produce a real workpiece which corresponds to an ideal workpiece within permissible tolerances.

The object is achieved by means of a simulation method for a data record which describes three-dimensional processing by a CNC-controlled processing machine, for example a milling machine. The simulation method includes:

determination of an initial data record which describes idealized processing instructions for the processing machine;

determination of a control data record from the initial data record with the aid of an arithematic unit, for a control unit controlling the processing machine; and determination of at least one two-dimensional projection of the processing from the initial data record and/or from the control data record, and representing it via a display device.

According to the present invention it is possible to fabricate a "virtual workpiece" or carry out virtual processing without fabricating a workpiece. In principle, the processing machine as such need not even be present.

An arithmetic unit is used to determine at least one intermediate data record from the initial data record, and the control data record is determined from the intermediate data record. It is also preferable to determine from the intermediate data record a two-dimensional projection of the processing and to represent it via a display device. This enables the simulation method to be used even more flexibly.

A final data record describing the actual processing can also be determined by computation from the control data record with the aid of a model describing a real response of the processing machine, and in which it is also possible to determine from the final data record at least one two-dimensional projection of the actual processing and to represent it via the display device.

The initial data record is generally a part program. Optionally, it is possible either for the part program itself to be assigned traversing speeds, traversing accelerations and track curvatures, or for the part program to be transformed into a polynomial series, the traversing speeds, traversing accelerations and track curvatures then being assigned to the polynomial series. Movements to be coordinated with one another, in two stages if appropriate, such as individual traversing options of the processing tool are then determined with the aid of the part program or the polynomial series which are then assigned traversing speeds, traversing accelerations and track curvatures. The movements to be coordinated with one another form the control data record. In these cases, the intermediate data record preferably corresponds to the part program with the traversing speeds, traversing accelerations and track curvatures assigned to it, or to the polynomial series, with or without the traversing speeds, traversing accelerations and track curvatures.

The real response of the processing machine can be described efficiently when this is done by machine parameters. For reasons of flexibility, the machine parameters can preferably be changed interactively at least partially in this case. As a rule, the parameters comprise at least one dimension of a processing tool of the processing machine.

The simulation method operates with particular flexibility when it is possible to select, preferably interactively, the data record which determines at least one two-dimensional projection and displays the same via the display device. In order to determine the at least one two-dimensional projection, a multiplicity of interpolation points which in their entirety describe the virtual three-dimensional workpiece are preferably determined with the aid of the selected data record.

Further advantages and details are apparent from the following description of an exemplary embodiment as shown, in the schematic representation

DESCRIPTION OF DRAWINGS

FIG. 1 illustrates a processing machine with a computer and a control unit.

FIG. 2 illustrates the computer of FIG. 1 in detail.

DETAILED DESCRIPTION OF THE INVENTION

Figure 3:
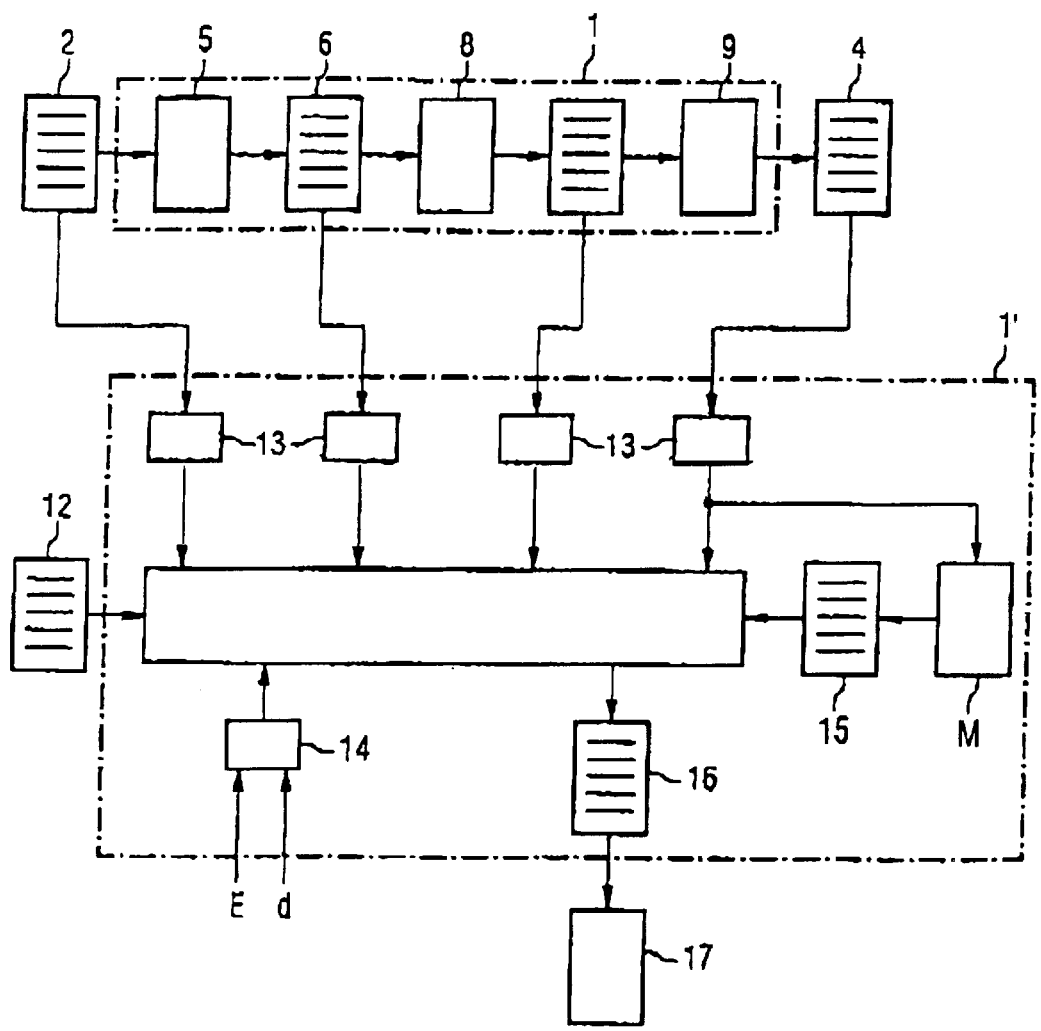
FIG. 3 illustrates a control device and a simulation and/or emulation computer.

In accordance with FIG. 1, an initial data record 2 is input into a computer 1, for example a PC 1. The initial data record 2 describes idealized processing instructions for a CNC-controlled processing machine 3. It is usually a so-called part program 2. The processing machine 3 is designed as a milling machine in the present instance. However, it could also be another machine tool, for example a drilling or turning machine. The processing machine 3 could also be designed as an industrial robot or a specialized machine.

The initial data record 2 describes a desired processing of a workpiece 11 by the processing machine 3. In accordance with FIG. 2, the computer 1 uses its program to determine from said initial data record a control data record 4 for the processing machine 3. The control data record 4 therefore likewise constitutes a desired processing for the workpiece 11, and the computer 1 forms a CNC controller for the processing machine 3.

In order to determine the control data record 4, the computer 1 initially transforms the part program 2 into a polynomial series 6, preferably in a function block 5, the so-called compressor 5. The polynomial series 6 yields a track to be covered by a processing tool 7, here a milling head 7. The user then assigns desired traversing speeds to the polynomial series 6. The computer 1 then calculates expected traversing speeds (v), expected traversing accelerations (a), and traversing steps (r) of the processing tool 7 as well as expected track curvatures. If these values (v, a, r) exceed permissible limiting values, the computer 1 corrects the movement guidance of the processing tool 7 correspondingly, such that permissible limiting values are observed.

The transformation of the part program 2 into the polynomial series 6 can also be omitted. In this case, the desired traversing speeds and the expected traversing speeds (v), the expected traversing accelerations (a) and the traversing steps (r) as well as the expected track curvatures are assigned to the part program 2. It is also possible to generate the polynomial series 6 directly by means of a CAD system.

The next step is to make use, in a further function block 8 of the computer 1, the so-called interpolator 8, of the polynomial series 6 and the traversing speeds (v), traversing accelerations (a), traversing steps (r), and track curvatures assigned to it to determine movements, to be coordinated with one another, of individual—as a rule axial—traversing options of the processing tool 7. This coordination is performed in two stages, since as a rule a so-called fine interpolator 9 is arranged downstream of the interpolator 8 as a further function block 9. The output signal of the fine interpolator 9 then forms the control data record 4. The track is therefore split up into individual axes or general degrees of freedom of movement of the processing tool 7. The intermediate data records thus formed also constitute a desired processing of the workpiece 11 by the processing machine 3.

The control data record 4 determined by the computer 1 is transmitted to a control unit 10. The latter controls the processing machine 3 in accordance with the control data record 4. The processing machine 3 therefore fabricates the workpiece 11 in a fashion controlled by the control unit 10 and in accordance with the control instructions implemented in the control data record 4. In this process, inter alia, traversing paths s adopted by the processing tool 7 are detected and transmitted to the control unit 10. The control unit 10 can therefore detect a nonideal response of the processing machine 3, in particular an elasticity response E of the processing machine 3, and compensate for it by correction.

In practice, deviations occur between the actually fabricated workpiece 11 and an ideal workpiece described by the initial data record 2. The extent of the deviations is a function of a multiplicity of factors, in particular of the transformation of the initial data record 2 into the control data record 4, the quality of the control by the control unit 10, the actual response of the processing machine 3 and the properties of the drive of the processing machine 3.

The deviations of the actually fabricated workpiece 11 from the ideal workpiece can be tolerated or not depending on their magnitude. Changes are required if the deviations cannot be tolerated. The changes in the control data record 4 can be performed in this case by changes in the initial data record 2, by changes in the transformation of the initial data record 2 into the control data record 4, by changes in the control exerted by the control unit 10, by a variation in the actual response, in particular in the elasticity response (E) and in the processing machine 3, and by adapting the properties of the drive of the processing machine 3. To the extent that properties of the processing machine 3 and/or of its drive are established, it is, of course, necessary to verify on the basis of theoretical calculations and/or experimental trials that these properties do in fact obtain.

In accordance with FIG. 3, a simulation and/or emulation computer 1' is provided in order to achieve optimization of the actually fabricated workpiece 11 as quickly as possible. The simulation and/or emulation computer 1' executes a computer program product 12. The initial data record 2, the polynomial series 6, the traversing speeds (v), traversing accelerations (a), and traversing steps (r), which are assigned to the polynomial series 6, as well as track curvatures and the control data record 4, in particular, are transmitted to the simulation and/or emulation computer 1' during execution of the computer program product 12. For this purpose, the computer program product 12 implements interfaces 13 by way of which the simulation and/or emulation computer 1' communicates with the computer 1.

Furthermore, when executing the computer program product 12, the simulation and/or emulation computer 1' simulates or models the control response of the control unit 10 and the actual response (including the elasticity response E) and the properties of the drive of the processing machine 3. It therefore determines by calculation with the aid of a model (M) a final data record 15 which describes a real processing of the three-dimensional workpiece 11.

The model (M) can be adapted—preferably interactively—to prescribable model parameters via a further interface 14. In particular, the elasticity response (E) of the processing machine 3 can be changed. The initial data record 2 can also be changed interactively via the further interface 14. Furthermore, it is also possible for at least one dimension (d) of the processing tool 7, for example the diameter of the milling head 7, to be changed interactively via the further interface 14. The further interface 14 is usually implemented in the form of a keyboard and/or a mouse control.

The—static and dynamic—elasticity response (E) of the processing machine 3 can be taken into account, for example, in the form of a parameterized differential equation. The description of the real properties of the processing machine 3 is therefore performed by machine parameters. The machine parameters can preferably also be changed interactively via the further interface 14. However, the elasticity response (E) of the processing machine 3 can also be taken into account by means of a finite element model (FEM) or a rigid or flexible multibody model (MKM, FMKM) or multibody system (MKS, FMKS) instead of by a parameterized differential equation.

One of the data records 2, 4, 6, 15 is selected for visualization. In the case of selection of the polynomial series 6, it is possible in the process further to distinguish whether said series is selected with or without the traversing speeds v, traversing accelerations a and traversing steps r which are assigned to the polynomial series 6, as well as the track curvatures. The selected data record 2, 4, 6 or 15 can be changed interactively in this case. It is, in particular, possible to extract only a portion of the selected data record 2, 4, 6 or 15.

The selection is also performed preferably interactively via the further interface 14. The selected data record 2, 4, 6 or 15 is then used to determine at least one two-dimensional projection. For this purpose, the selected data record 2, 4, 6 or 15 is used to determine a multiplicity of interpolation points which in their entirety describe the virtual three-dimensional workpiece.

The entirety of the interpolation points forms a display data record 16. The format of the data of the display data record 16 is a function of the selected data record 2, 4, 6 or 15. The simulation and/or emulation computer 1' uses the interpolation points to determine the at least one two-dimensional projection of the virtual workpiece 11. This projection is represented by the simulation and/or emulation computer 1' via a display device 17, typically a monitor 17 or a TFT display 17.

The representation of the selected data record 2, 4, 6 or 15 comprises polyhedra. If the selected data record 2, 4, 6 or 15 comprises only positional data, it is, of course, also only positional data which can be used for visualization. If, by contrast, the selected data record 2, 4, 6 or 15 also comprises data on speed, acceleration, stepping and curvature, these can also be used for visualization. For example, different speeds (v), accelerations (a), steps (r), or curvatures can be represented by different color values. If appropriate, it is also possible to undertake color transitions or color gradations between neighboring interpolation points.

The two-dimensional projections of the selected data record 2, 4, 6 or 15 can be changed interactively, as is generally customary and known. In particular, the display can be rotated such that there is a change in the viewing angle from which it is seen. Furthermore, it can be zoomed in on such that the imaging scale changes as a result. Furthermore, it is possible to prescribe a lighting configuration interactively.

In order to be able to assess the influence of individual function blocks 5, 8, 9 in isolation, it is further possible for the function blocks 5, 8, 9 to be masked out interactively and individually. The masking out of one of the function blocks 5, 8 or 9 means that the masked-out function block 5, 8 or 9 is jumped over in determining the control data record 4.

If, for example, the compressor 5 is masked out, the polynomial series 6 is not determined. In this case, the traversing speeds (v) etc. are assigned to the part program 2 and—in one or two stages—the movements, to be coordinated with one another, of individual traversing options of the processing tool 7 are determined with the aid of the part program 2 and the additional data (v, a, r) assigned thereto. The control data record 4 corresponds in this case, as previously, to the movements to be coordinated with one another. In this case, of course, together with the additional data (v, a, r) assigned to it, the part program can be selected as a data record to be displayed.

Quick optimized control data records 4 for processing machines 3 of all types can be formulated easily and cost-effectively by means of the simulation method according to the invention.

We claim:

1. A simulation method for a data record which describes three-dimensional processing by a CNC-controlled processing machine of a fabricated workpiece comprising the steps of:

determining an initial data record comprising desired processing instructions for the processing machine;

determining a control data record for controlling the processing machine from the initial data record using an arithmetic unit which performs at least one transformation of the initial data record into said control data record;

selecting a data record from said at least one transformation;

generating a display data record from said selected data record indicating deviations of the fabricated workpiece caused by said at least one transformation and/or by deviations caused by the processing machine; and displaying the display data at least by a two-dimensional projection.

2. The simulation method as claimed in claim 1, wherein at least one intermediate data record is determined from the initial data record, and the control data record is determined from the intermediate data record, and further wherein the display data record is determined from the intermediate data record and caused to be displayed.

3. The simulation method as claimed in claim 2, wherein the initial data record is a part program comprising at least one assigned traversing speed, traversing acceleration and track curvature, which are used to determine movements to be coordinated with one another in two stages comprising individual traversing options of the processing tool forming the control data record and the intermediate data record.

4. The simulation method as claimed in claim 3, wherein the part program can be transformed into a polynomial series having at least one assigned traversing speed, traversing acceleration and track curvature which are used to determine movements to be coordinated with one another of individual traversing options of the processing tool, and wherein the movements to be coordinated with one another form the control data record, and wherein the intermediate data record corresponds to the polynomial series.

5. The simulation method as claimed in claim 1, wherein a final data record describing the actual processing can be determined by computation from the control data record with the aid of a model describing an actual response of the processing machine, and wherein at least one two-dimensional projection of the actual processing may be determined from the final data record and caused to be displayed.

6. The simulation method as claimed in claim 1, wherein the response of the processing machine is described by machine parameters.

7. The simulation method as claimed in claim 6, wherein the machine parameters can be at least partially changed interactively.

8. The simulation method as claimed in claim 6, wherein the machine parameters comprise at least one dimension of a processing tool of the processing machine.

9. The simulation method as claimed in claim 1, wherein data records are selectively used for generating the display data record indicating said deviations.

* * * * *